US008061376B2

(12) United States Patent
Ryan et al.

(10) Patent No.: US 8,061,376 B2
(45) Date of Patent: Nov. 22, 2011

(54) STABLE WHEELED WALKER DEVICE

(75) Inventors: Stephen Ryan, Mississauga (CA); Susan Hardy, Toronto (CA); William Johnson, Pefferlaw (CA); Michael Doell, Toronto (CA)

(73) Assignee: Holland Bloorview Kids Rehabilitation Hospital, Toronto (CA)

( * ) Notice: Subject to any disclaimer, the term of this patent is extended or adjusted under 35 U.S.C. 154(b) by 65 days.

(21) Appl. No.: 12/136,882

(22) Filed: Jun. 11, 2008

(65) Prior Publication Data

US 2008/0302402 A1 Dec. 11, 2008

(51) Int. Cl.
*A61H 3/04* (2006.01)
*B62B 7/00* (2006.01)

(52) U.S. Cl. ......... 135/67; 135/85; 135/74; 280/87.021; 280/642; 482/68; 482/105

(58) Field of Classification Search .................... 135/65, 135/67, 74, 84, 85; 280/87.05, 87.021, 87.051, 280/87.041, 642, 646; 297/5–9; 482/67–68, 482/105
See application file for complete search history.

(56) References Cited

U.S. PATENT DOCUMENTS

| | | | | | |
|---|---|---|---|---|---|
| 4,126,331 | A | * | 11/1978 | Sloan et al. | 280/650 |
| 5,716,063 | A | * | 2/1998 | Doyle et al. | 280/87.05 |
| 5,816,593 | A | * | 10/1998 | Che | 280/87.041 |
| 5,979,928 | A | * | 11/1999 | Kuo | 280/642 |
| 6,039,677 | A | * | 3/2000 | Spletzer | 482/105 |
| 6,092,824 | A | * | 7/2000 | Ritchie et al. | 280/304.1 |
| 6,099,002 | A | * | 8/2000 | Uchiyama | 280/87.021 |
| 6,290,197 | B1 | * | 9/2001 | Newton | 248/346.2 |
| 6,311,708 | B1 | * | 11/2001 | Howle | 135/67 |
| 6,338,355 | B1 | * | 1/2002 | Cheng | 135/67 |
| 6,481,730 | B2 | * | 11/2002 | Sung | 280/87.05 |
| 6,494,469 | B1 | * | 12/2002 | Hara et al. | 280/87.041 |
| D481,336 | S | * | 10/2003 | Wu | D12/130 |
| 6,688,633 | B2 | * | 2/2004 | van't Schip | 280/642 |
| 6,733,018 | B2 | * | 5/2004 | Razon | 280/87.021 |
| 6,739,610 | B2 | * | 5/2004 | Connors et al. | 280/304.1 |
| 6,837,503 | B2 | * | 1/2005 | Chen et al. | 280/87.021 |
| 6,913,279 | B1 | * | 7/2005 | Opalka et al. | 280/642 |

FOREIGN PATENT DOCUMENTS

| | | | | |
|---|---|---|---|---|
| JP | 07024025 | A | * | 1/1995 |
| JP | 10216183 | A | * | 8/1998 |
| JP | 2001353193 | A | * | 12/2001 |
| JP | 2002306552 | A | * | 10/2002 |
| JP | 2005185512 | A | * | 7/2005 |

* cited by examiner

*Primary Examiner* — Winnie Yip
(74) *Attorney, Agent, or Firm* — Macleod Dixon LLP

(57) ABSTRACT

A posterior walker is disclosed comprising: a foldable, tubular frame; adjustable handles; wheels including anti-rollback wheels in the back and pivoting wheels in the front; a flexible, adjustable lower back support strap; features to adjust the handling and stability of the walker, to meet the mobility and standing needs of persons with unsteady gait and standing posture, namely an adjustable weighting means; and optionally backpack storage. In one embodiment, the adjustable weighting means is provided by use of weighted stability cuffs.

10 Claims, 15 Drawing Sheets

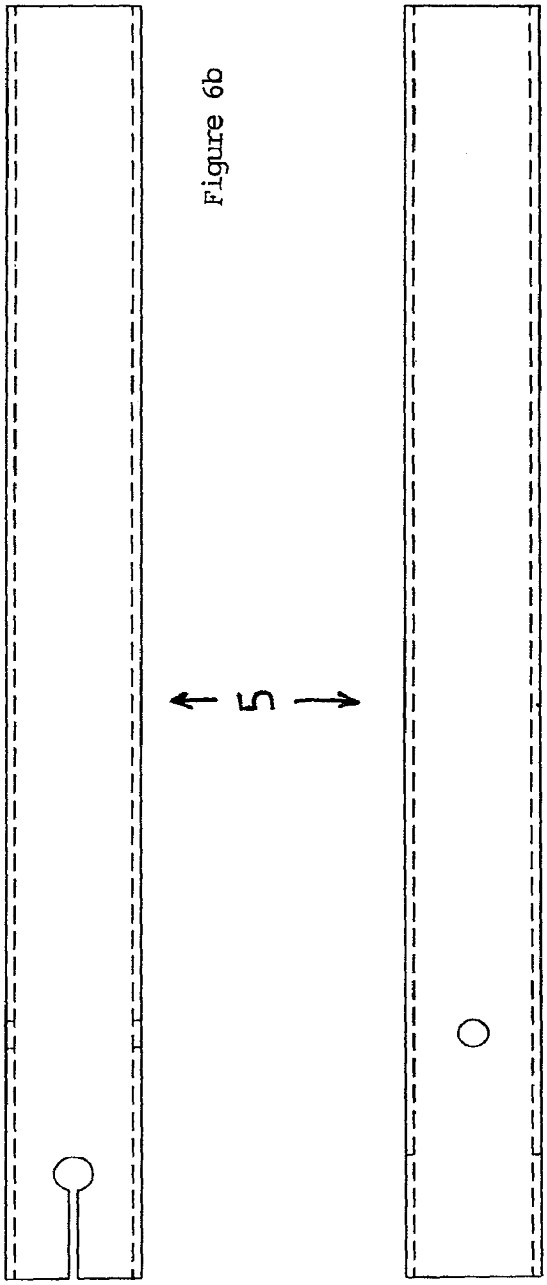
Figure 6b
Figure 6c
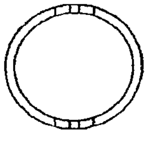
Figure 6a

STABLE WHEELED WALKER DEVICE

FIELD OF THE INVENTION

The present invention relates to the field of rehabilitation. In particular, the present invention relates to assistive technology devices for users who have balance problems and need external support to walk.

BACKGROUND OF THE INVENTION

Many children and youth with physical disabilities have motor coordination problems that make it difficult to walk without support. Children, who can bear weight through their legs and feet, but lack the strength or motor coordination to use canes or crutches either rely on stationary walkers (walkers without wheels), or wheeled walkers to ambulate. Children's walkers increase standing and walking stability, improve functional mobility, and reduce the likelihood of falls. These commonly used assistive technology devices help children to participate more fully in daily living activities at home; at school, and in the community.

Although adults and seniors with balance problems or unsteady gait tend to use wheeled walkers that they push as they walk; children with neurodevelopmental disabilities, such as cerebral palsy, walk much better when they use a walker that they pull as they walk. These types of walkers are called reverse or posterior walkers. See, for example, U.S. Pat. No. 6,311,708. Posterior placement of the walker is generally preferred to anterior placement because this orientation allows children to walk more upright, have better control while walking, and improve their access to doors, tables, and other objects.

Examples of commercially available posterior walkers include Kaye™ posture control walkers (Kaye Products, Inc., Hillsborough, N.C.), the Nurmi Neo™ walking aid (Otto Bock HealthCare, Minneapolis, Minn.) and the Crocodile™ gait trainer (Snug Seat, Inc., Matthews, N.C.).

Existing posterior walkers are typically tubular frames configured to extend from the ground to the level of the child's hips. The frame surrounds the child on three sides, but is displaced outwardly from the body to provide the child unhindered movement within the frame during gait. The frame typically contacts the ground at three or four points to provide enhanced lateral, forward and backward stability for the child. The frame contacts the ground via rubber tips and/or wheels. A child who is very unsteady and unable to control a wheeled walker normally requires rubber tipped ends; whereas, a child who has greater dynamic balance obtains greater mobility using a frame with two, three, or four wheels.

Wheeled walkers commonly have two waist-high handles that children can grip with their hands, or their hands and forearms. The handles allow children to pull and steer the walker as they walk. To customize the handle height for different sizes of children, the handles may be configured to adjust in height with, or relative to; the frame of the walker. Current walkers also have options that allow handles to be adjusted in depth and width to optimize the positioning of the child within the walker.

Posterior wheeled walkers are available in a range of sizes and have accessories that may be added to change the rolling resistance of wheels or prevent them from rotating rearward. These features are useful for children who either are unable to control walkers that have free-rotating wheels, or frequently lose balance because they lack the motor coordination to provide compensatory backward step if the walker moves rearward.

Adjustments made to a walker to accommodate a larger child, or one who has outgrown the walker's current setting, have very little effect on its stability (i.e. its resistance to tipping). Increasing the distances between the ground contact points increases the multidirectional stability of a walker. However, a wider base of support means that the walker is more difficult to direct through doorways, hallways, and in rooms with furniture. Since existing walkers do not have explicit methods for controlling its stability, these devices generally have a fixed base of support and low centre of mass to provide the same level of stability for all children.

In general, children who are unable to walk without support receive a walker when they are between two and three years old. These children take time to learn how to explore their environments with a walker. Therefore, they tend to rely more heavily on a walker for support than older children who are more experienced. As children age, they may bear more weight through their legs, develop improved motor coordination, and become more competent in handling a wheeled walker. To provide greater mobility for the child as s/he becomes a proficient walker user, it would be beneficial to provide a walker that could be adjusted to match its handling to the developmental needs of the child.

In view of the foregoing, a walker with improved stability that helps persons with physical disabilities, unsteady gait or balance problems to walk is desirable.

SUMMARY OF THE INVENTION

The object of the invention is to provide a wheeled, adjustable, foldable walker with improved stability.

In one aspect, the present invention is a foldable, adjustable wheeled walker device comprising a lightweight tubular frame having two rear legs wherein each leg is terminated with single wheels; and two front legs wherein each leg is terminated with pivoting dual wheels; two adjustable handle assemblies extending from the rear legs; and at least one removable stability member adapted to engage the light weight tubular frame.

In another aspect, the walker may contain a saddle connecting the two rear legs with the two front legs through a pivot.

In another aspect, the walker may contain wheels attached to the rear legs are equipped with an anti-rollback means.

In another aspect, the walker may contain a cross-brace on each side of the walker providing a structural link between the two rear legs and the two front legs and one end of each cross-brace is disconnetable allowing for the rear legs and front legs to fold towards the frame.

In another aspect, the walker may contain a handle assembly comprising a hand grip adapted to engage a handle extension member which connects to a handle extension receiver wherein each handle extension member is bent in two planes, one bend to position the handle extension member inwardly to position the hand grip in close proximity of the user and another bend to position the handle extension member in an orientation parallel to the ground.

In another aspect, the walker may contain a hand grip that is telescopically and removably connected to the horizontal end of the handle extension member by a pair of fasteners and threaded back strap retainers.

In another aspect, the walker may allow for the terminal end of each handle assembly to locate slidably within a handle extension receiver wherein the handle extension receiver is connected to the light weight tubular frame by at least one dual tube split clams and the height of each handle assembly is adjustable via a removable double ball lock pin.

In yet another aspect, the walker may contain a stability weight comprising a stability cuff that is securely and circumferentially attached to the frame and consists of a plurality of elasticized closable pockets, each pocket consisting of a slot at one end to allow a weight to be foldable, adjustable or removed.

BRIEF DESCRIPTION OF THE DRAWINGS

A detailed description of one or more embodiments is provided herein below by way of example only and with reference to the following drawings, in which:

FIGS. 6*a*, 6*b* and 6*c* displays the bottom, side and rear views respectively of the handle extension receiver;

Figure 1A:
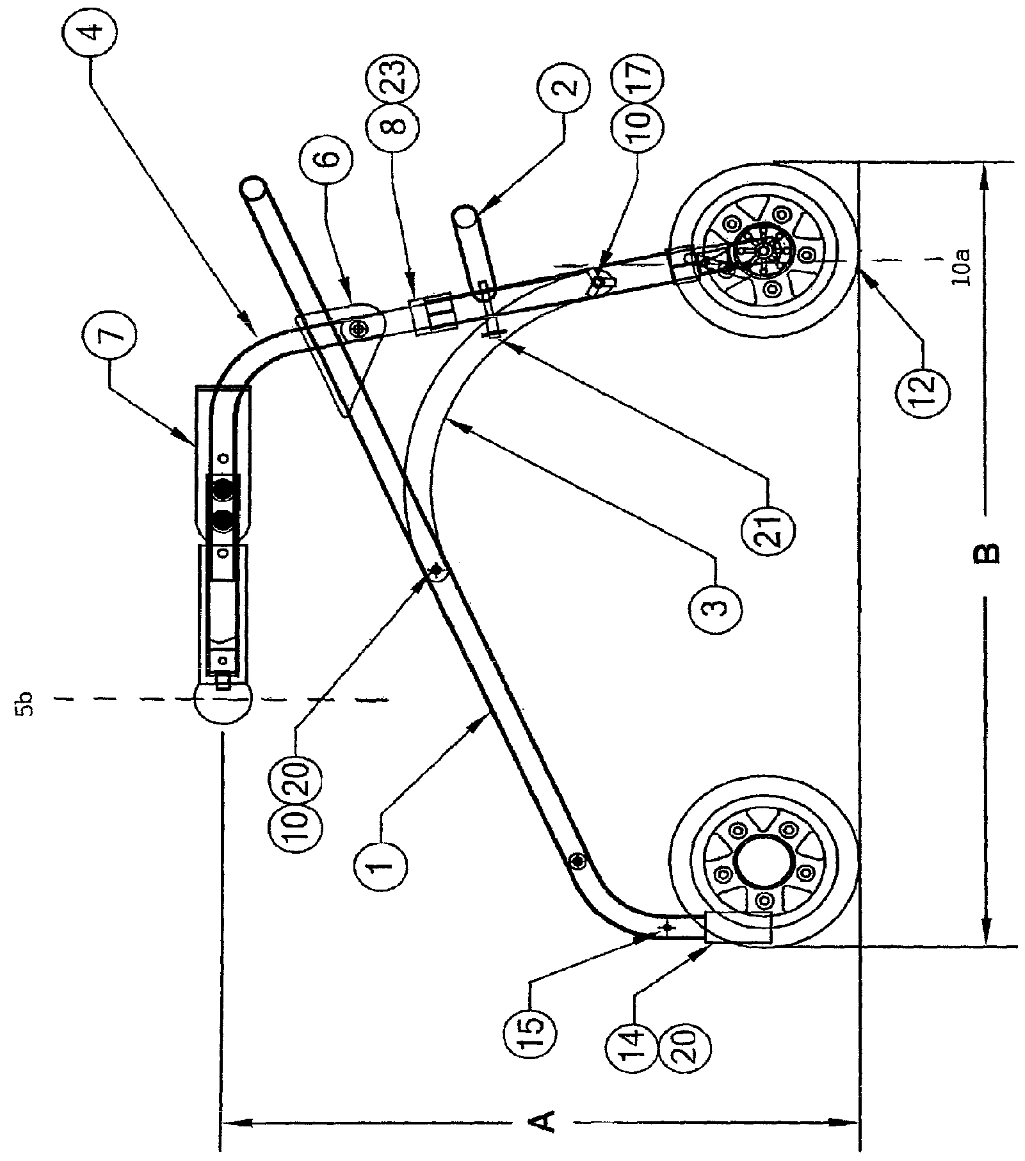
FIGS. 1*a* and 1*b* illustrates the side and rear views respectively of the walker.

In the drawings, one or more embodiments of the present invention are illustrated by way of example. It is to be expressly understood that the description and drawings are only for the purpose of illustration and as an aid to understanding, and are not intended as a definition of the limits of the present invention.

DETAILED DESCRIPTION OF THE INVENTION

According to an embodiment of an aspect of the present invention, there is illustrated a foldable, adjustable wheeled walker device comprising a lightweight tubular frame having two rear legs wherein each leg is terminated with single wheels; and two front legs wherein each leg is terminated with pivoting dual wheels; two adjustable handle assemblies extending from the rear legs; and at least one removable stability member adapted to engage the light weight tubular frame.

One separate, curved cross-brace on each side of the walker provides a structural link between the front and rear legs of the frame when in use. Folding of the frame is achieved by disconnecting one end of each cross-brace, then allowing the rear and front legs to freely fold into each other about the pivot.

Two adjustable handle assemblies include a width, vertical and depth adjustment means. The adjustable handle assemblies are provided to extend upwardly and parallel to the rear legs, then bend downwardly to provide a length of tubing that is generally horizontal. Adjustable hand grips allow the handle location to be adjusted to meet the needs of the user. An adjustable, flexible rear support or strap connects the handles to provide a contact surface at or above the hips of the user. This support or strap is important to limit the child's rearward placement within the walker and cue the child to maintain an upward posture while ambulating.

According to another aspect of the present invention, the removable adjustable stability member is a removable, weighted stability cuff which may be provided on each side of the front support tube near the pivoting front wheels. According to an embodiment of this aspect, the cuff can be fabric with a pair of straps that holds the cuff securely and circumferentially using hook and loop fasteners, for example. The weighted stability cuff contains three individual, elasticized pockets for up to three counterweights, for example. Each cuff supplied with three weights provides the maximum weight and rearward stability for the child user. The weights may be removed from the cuffs in pairs to reduce the stability and enhance the maneuverability of the walker to match the abilities of the child.

According to yet another aspect of the present invention, a soft fabric backpack may be removably attached between rear legs of the walker. The backpack preferably has various compartments for storage of school supplies toys, and snacks.

It should be understood that the weight of the frame, wheels, attachment hardware and backpack of the walker according to an embodiment of the present, invention are preferably selected to provide the lowest strength to weight ratio possible using conventional materials to minimize cost. Since the weights of the structural components are relatively low, the stability cuff weights needed to achieve the desired stability and handling of the walker are also relatively low. The overall weight of the walker with the full weighted cuff remains manageable by caregivers who must fold and lift the walker for storage.

Figure 1B:
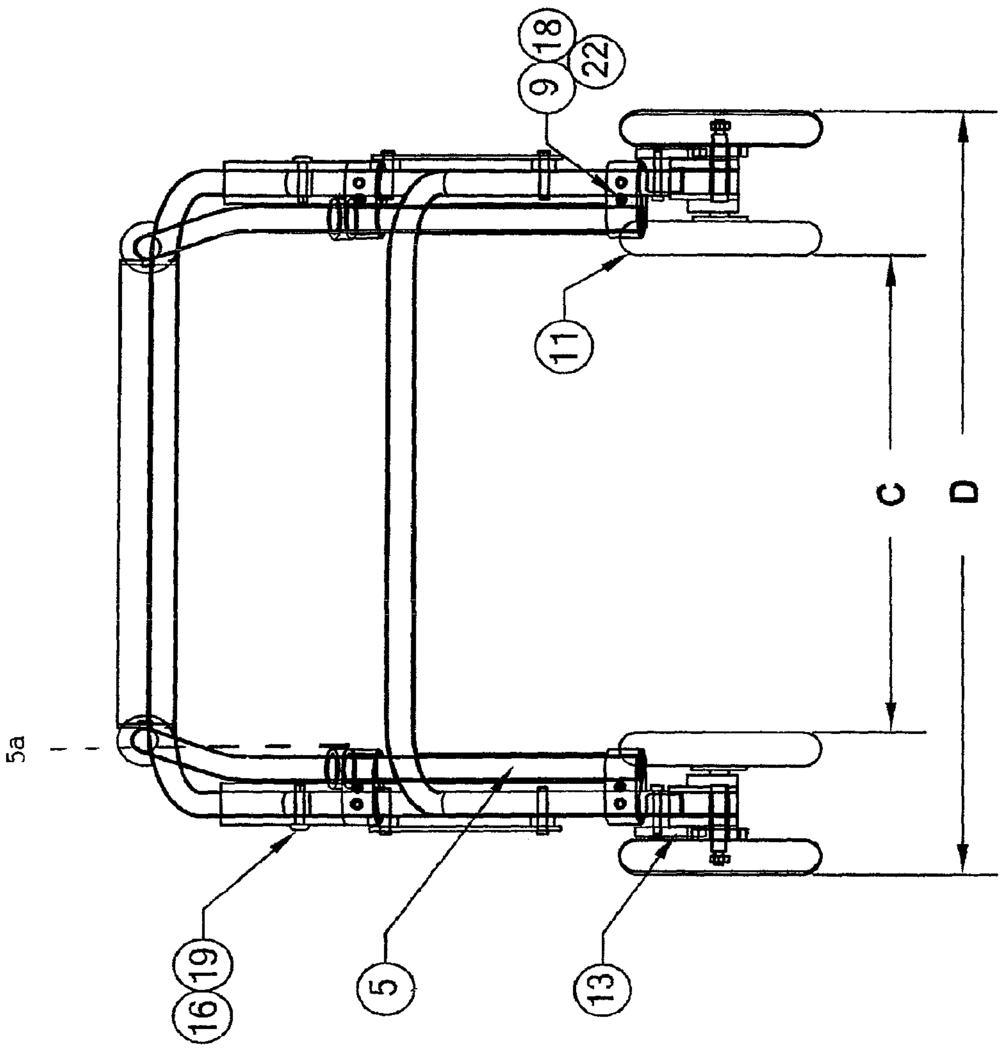

Referring now to the drawings, FIG. 1A and FIG. 1B shows the invention in its position for use as a walker. The device has a front (main) support tube 1 that is pivotably connected to a rear (cross) assembly 2 through a main bracket 6. The front support tube 1 is fixed in its in-use position to the rear leg assembly by a radial cross brace 3 located on both sides of the walker. The brace 3 is mechanically fastened to the front support tube by a fastener 20 on one end, and a threaded hand knob 17 at the other end. The threaded end of the hand knob 17 runs through a hole in the end of the cross brace 3. The knob is captivated on one side of the cross brace by the knob and on the other side by a retaining ring.

The end of the front support tube 1 is terminated on both ends by a pivotable dual front wheel assembly 11 by means of a specially design adapter 14 (shown in FIG. 11). The adapter 14 is a bar that locates within and is mechanically attached to the tubular ends of the front support tube 1 and the tubular housings of the dual front wheel assemblies 11. Similarly, the lower end of the cross tube assembly 2 is terminated by a single, non-pivotable rear wheel assembly 12.

The terminal end of each of two handle assemblies 4 locates slidably within a handle extension receiver 5 that is connected to the rear tube assembly 2 by two dual tube split clamps 9 on each side. The height of the handle assembly 4 is incrementally adjustable upwardly or downwardly via a removable double ball lock pin 21. In its in-use position, the pin 21 connects the handle assembly 4 to the handle extension receiver 5 through matched holes in these components The pin 21 is inserted into a single through hole in the extension receiver 5 and one of a series of through holes in the handle assembly 4. It is the matching hole selected in the handle assembly 4 that affixes the handle height. A handle extension stopper S prevents the handle assembly 4 from sliding down into handle extension 5 when the ball lock pin 21 is removed. The pin 21 is removed either to adjust the height of the handle assembly 4 relative to the handle extension receiver 5, or, if necessary, to remove the handle assembly 4 from the receiver 5 before folding the walker for storage. A flexible rear back strap 7 is removably affixed to the inside of and adjusts in height with the handle assemblies 4. Further, the rear back strap 7 may be removed and reattached horizontally relative to the position of handle assemblies 4.

As an example, a walker according to this embodiment, in this case particularly directed to a child user, may have the following approximate, dimensions: A=16 to 25"; B=25 to 27"; C=13 to 15"; and D=21 to 23".

Figures 2A, 2B:
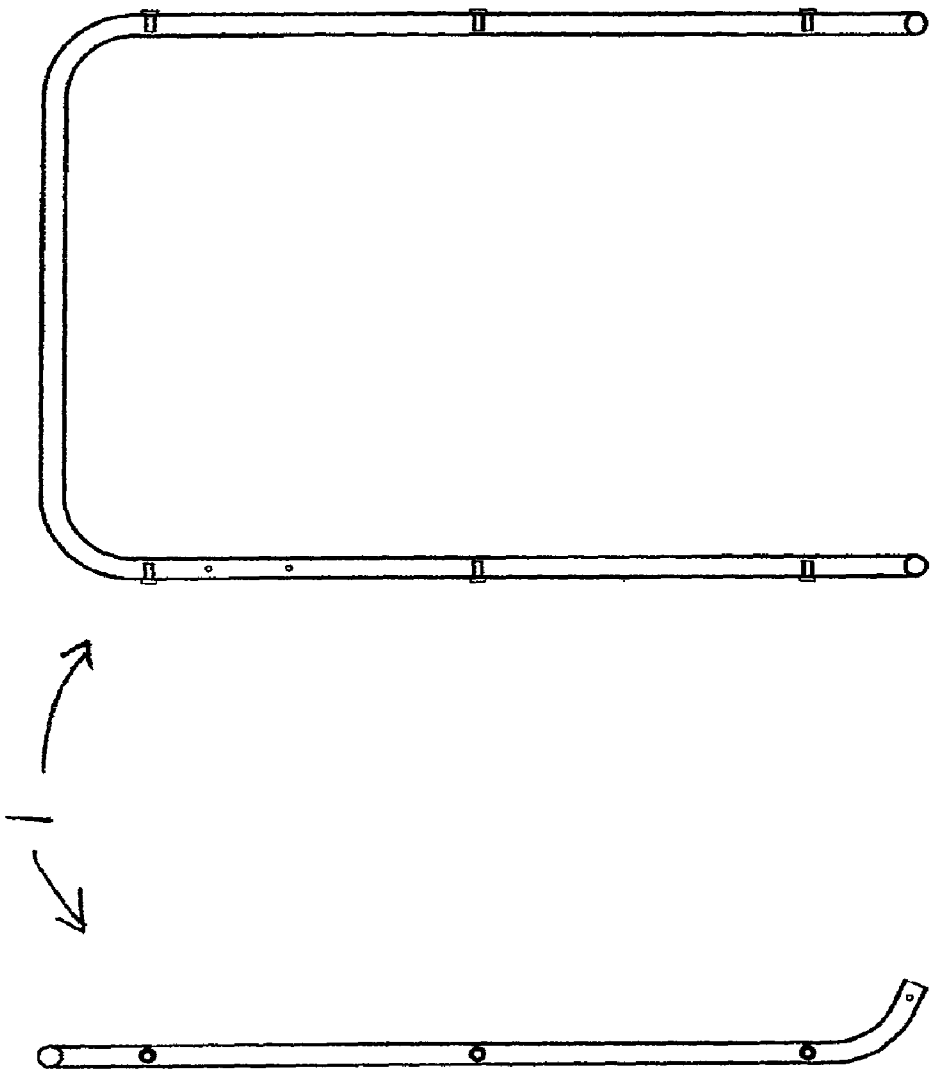
FIGS. 2*a* and 2*b* displays the side and rear views respectively diagonal front legs (or main support tube)

FIGS. 2*a* and 2*b* shows the configuration of the main support tube 1. The tube is bent in a U-shape configuration to outline the perimeter of the walker. Small diameter, thin-walled aluminum tubing, for example, with threaded rivet-style nuts are affixed to minimize the contribution of this member to the weight of the walker and reduce the likelihood of hand injuries caused by protruding fasteners. For example, ¾" OD×0.065 wall 6061-T6 aluminum tubing can be used.

Figure 3B:
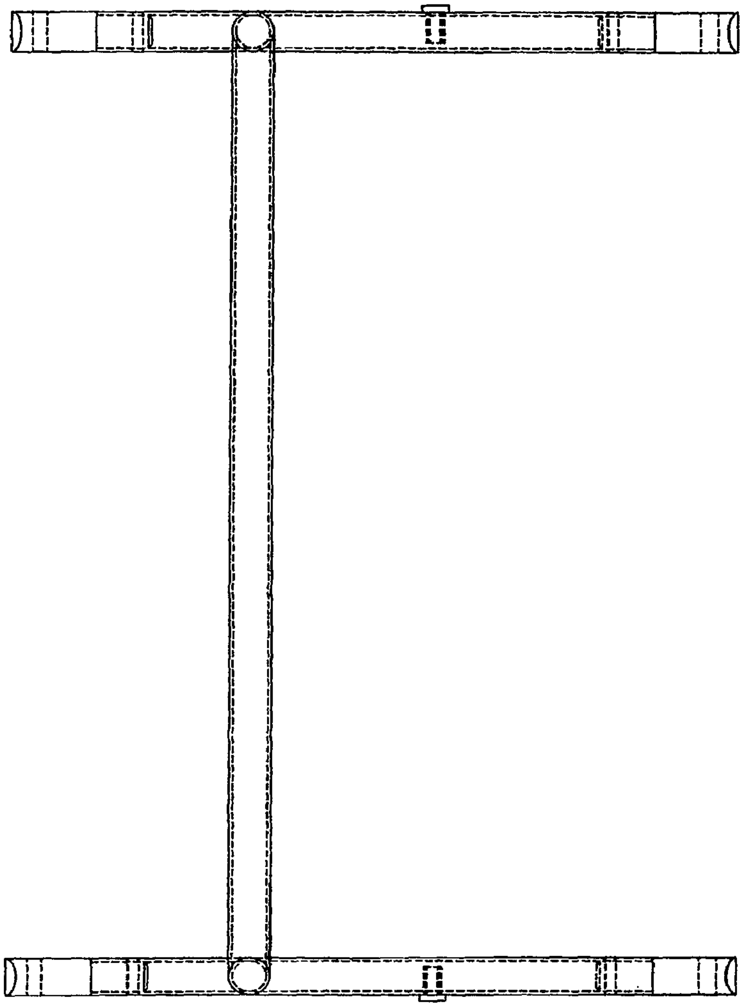
FIGS. 3*a* and 3*b* illustrates the side and rear views respectively of the rear tube assembly.
Figure 3A:
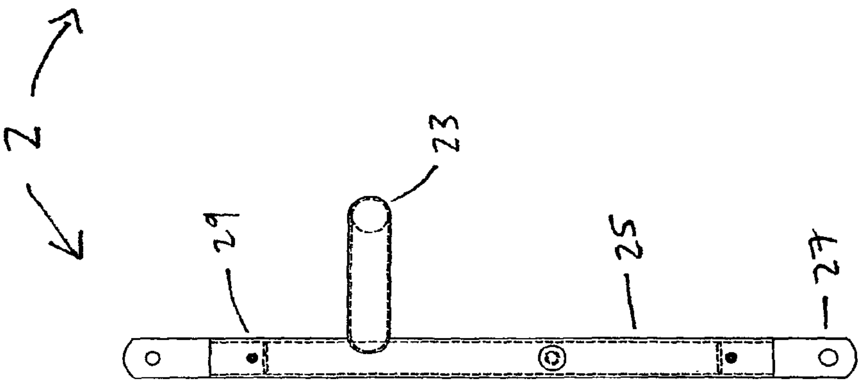

FIGS. 3*a* and 3*b* illustrates the rear assembly 2 comprising tube weldment that incorporates ‘the cross support tube 23 and cross tube uprights 25. Aluminum upright end fittings 27 are each pinned with a coil spring pin 29 to terminate the ends of upright tubes 25. The end fittings each accept a rear wheel assembly 12 axle at the lower end, and a pivot axis fastener (19 in FIG. 1B) at the upper end.

Figure 4:
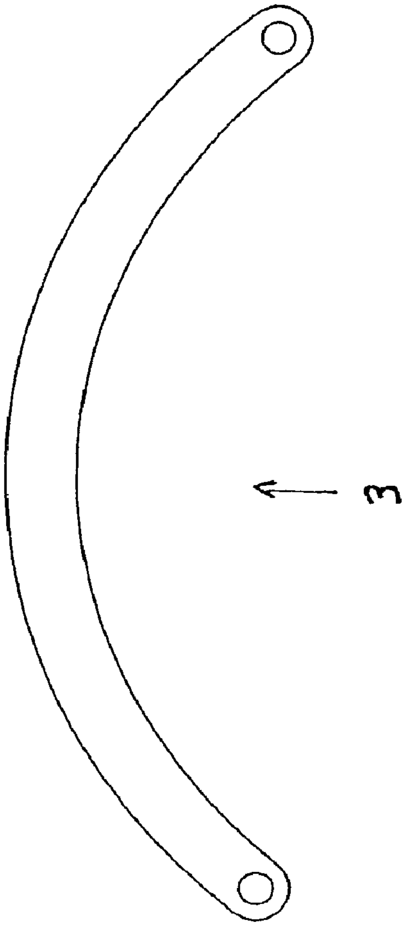
FIG. 4 shows the side view of the cross brace.

The cross brace 3, shown in FIG. 4, is a structurally strong member that connects and bears the separation loading of the front support tube 1 and the cross tube assembly 2. The brace 3 is configured to run tangentially to both connecting members when the walker is in its in-use position to avoid contact with the child's legs and feet during use. As an example, the cross brace 3 can be fabricated with stainless steel 302.

Figure 5B:
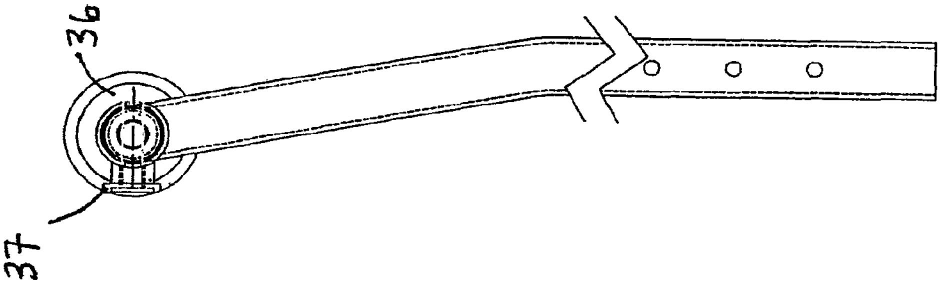
FIGS. 5*a* and 5*b* illustrates the side, sectional, and rear sectional views respectively of the handle assembly.
Figure 5A:
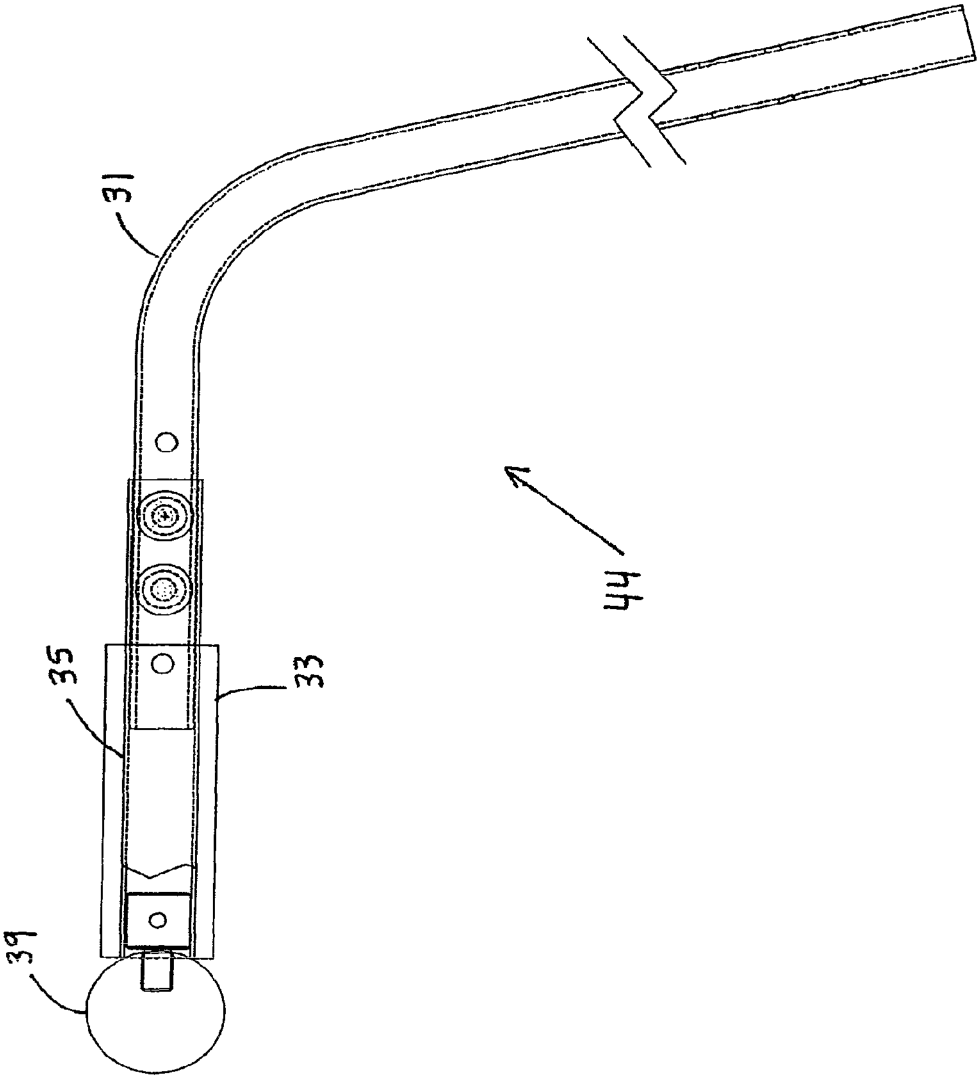

FIGS. 5*a* and 5*b* shows the right hand version of the handle assembly 4. A handle extension 31 is the member that connects to the handle extension receiver 5 described previously. The handle extension 31 is bent in two planes—one bend to position the tube inwardly to place the hand grip 33 in close proximity to the child, and another bend to position the handle extension 31 in an orientation that is generally parallel to the ground. The handle 35 is telescopically and removably connected to the horizontal end of the handle extension tube 31 by a pair of fasteners 36 and threaded back strap retainers 37. Incremental displacement of the handle 35 is achieved by removing the fasteners 36, sliding the handle 35 axially along the tubular end of the handle extension tube 31 and relocating the fasteners 36 through the mating holes. The two back strap retainers 37 have a flanged end to retain one end of the rear back strap 7 through its adjustment hales. The other end of the rear back strap 7 is connected to a pair of retainers ob the inside surface of the other handle. A soft, rubberized handgrip 33 is located axially over the handle 35 to provide a comfortable support surface for the child's band. A plastic ball 39 terminates the handle 35 to cue the child as to the location of his/her hand on the handgrip 33.

The tubular configuration of the handle extension receiver 5 is shown in FIGS. 6*a*, 6*b* and 6*c*. At the upper end of the tube has a sawcut end with a stress relief hole at its root. The upper dual split clamp 9 locates over this end such that as the clamp is tightened, the extension receiver 5 elastically deflects to eliminate the clearance between the handle assembly 4 and the extension receiver 5. This feature improves the responsiveness of the walker to movement at the handle by eliminating the play between the handle assembly 4 and the handle extension receiver 5. For example, the handle extension receiver 5 can be fabricated, from ⅞"OD×0.049 wall 6061-T6 aluminum tubing.

Figure 7C:
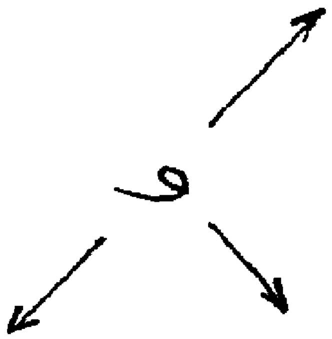
FIGS. 7*a*, 7*b* and 7*c* illustrates the top, side and front views respectively of the pivot (main) bracket.
Figure 7C:
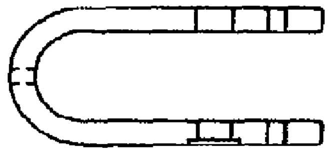
Figure 7A:
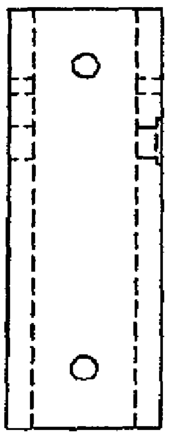
Figure 7B:
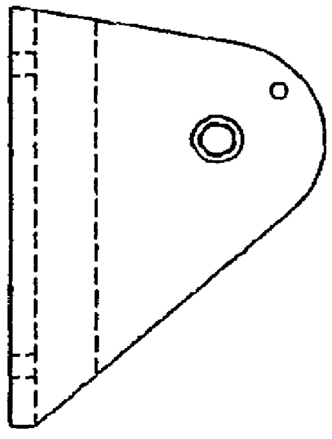

The left hand version of the main bracket 6 is displayed in FIGS. 7*a*, 7*b* and 7*c*. The main bracket 6 is made from an acetyl plastic, for example, to provide strength and lightness for the assembly. The cross bore in the bracket is sized to locate snuggly over the front support tube 1. This is achieved by providing an undersized lead in that allows the bracket 6 to snap securely onto the front support tube 1. Since the plastic has excellent bearing characteristics, no additional bushings are provided to support the main pivot fastener 19.

Figure 8B:
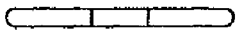
FIGS. 8*a* and 8*b* shows the side and rear views respectively of the flexible back strap.
Figure 8A:
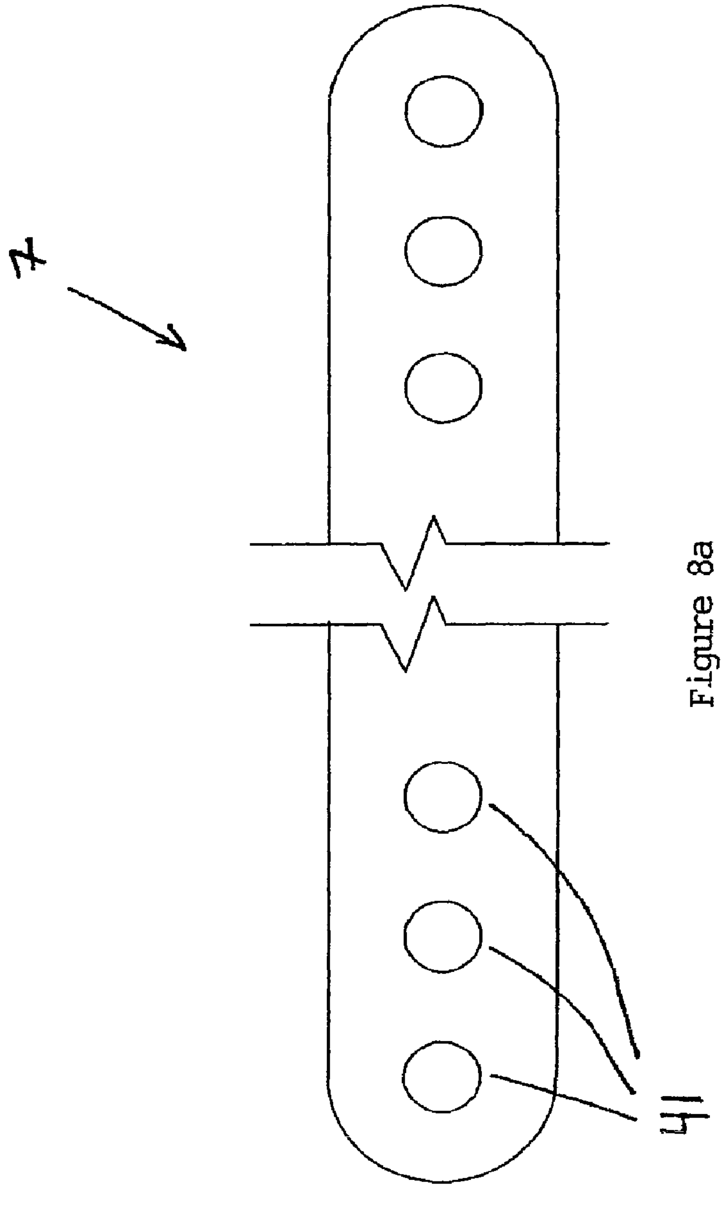

FIGS. 8*a*, 8*b* and 8*c* shows the rear back strap 7 with adjustment holes 41 for connection to the back strap retainers 37 of the handle assemblies 4. The rear back strap 7 can be an extendable thermoplastic rubber that provides strength and a firm contact surface at the level of the child user's hips. For example, the rear back strap, 7 can be Santoprene™. extrusion. Incremental horizontal translation of the rear back strap 7 is achieved by pulling the strap ends away from the handle 35 such that the two back strap retainers 37 are pulled through an adjacent pair of adjustment holes 41. Another pair of adjacent adjustment holes 41 is relocated over the back strap retainers 37 and stretched elastically over the flange of the back strap retainers to secure the strap to the handle 35.

Figures 9A, 9B:
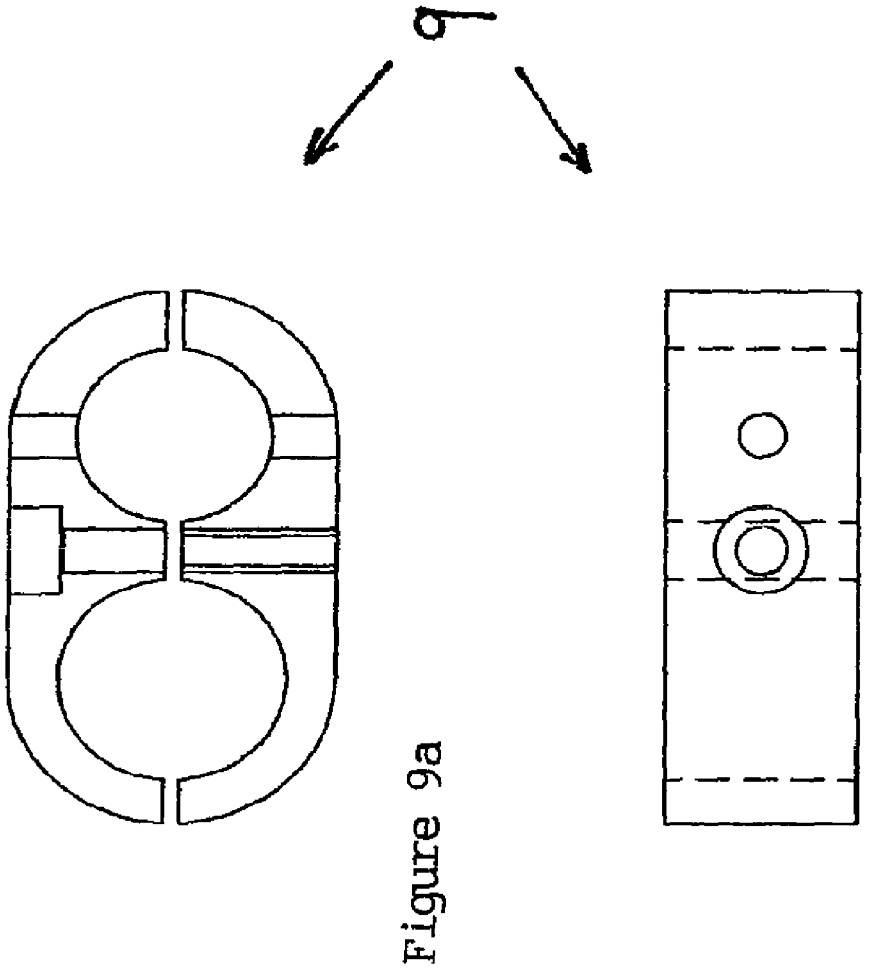
FIGS. 9*a* and 9*b* illustrates the side and top views respectively of the split clamp for the handle extension receiver and the rear tube assembly.

FIGS. 9*a* and 9*b* displays the dual split clamp 9 that connects the handle extension receiver 5 to the cross support tube assembly 2. A through hole in one half of the clamp and a threaded hole in the other half allows a fastener to apply gripping forces simultaneously to the handle extension tube 5 and cross support tube assembly 2.

Figure 10B:
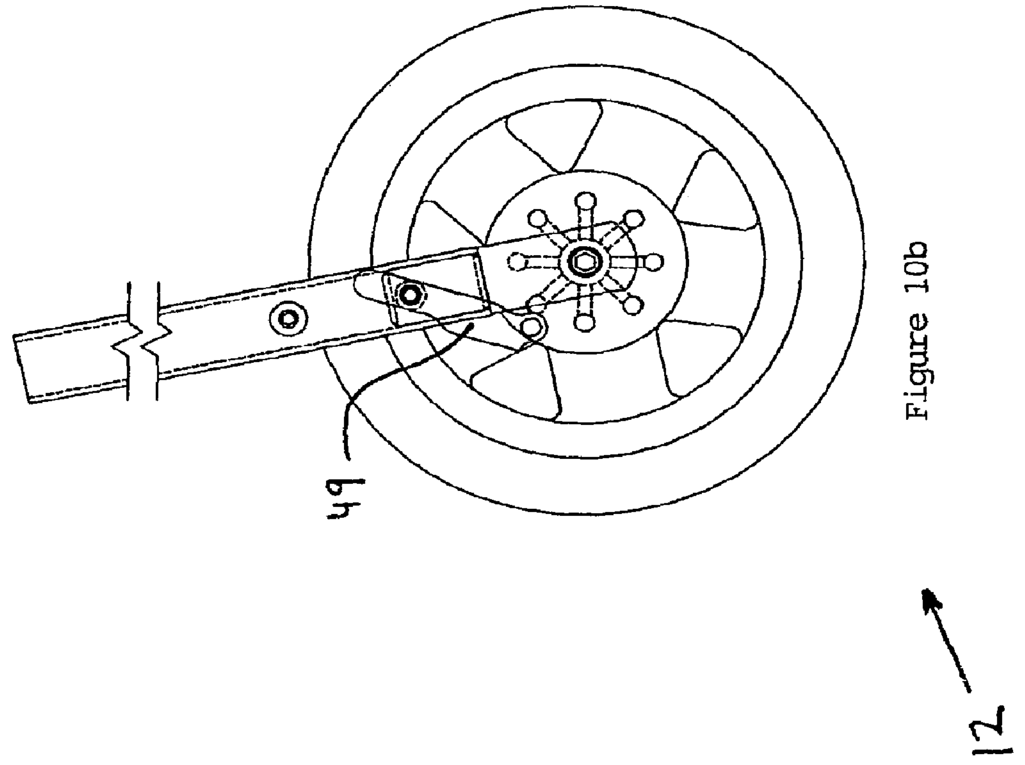
FIGS. 10*a* and 10*b* shows the rear partial cross-sectional and side views respectively of the rear wheel assembly.
Figure 10A:
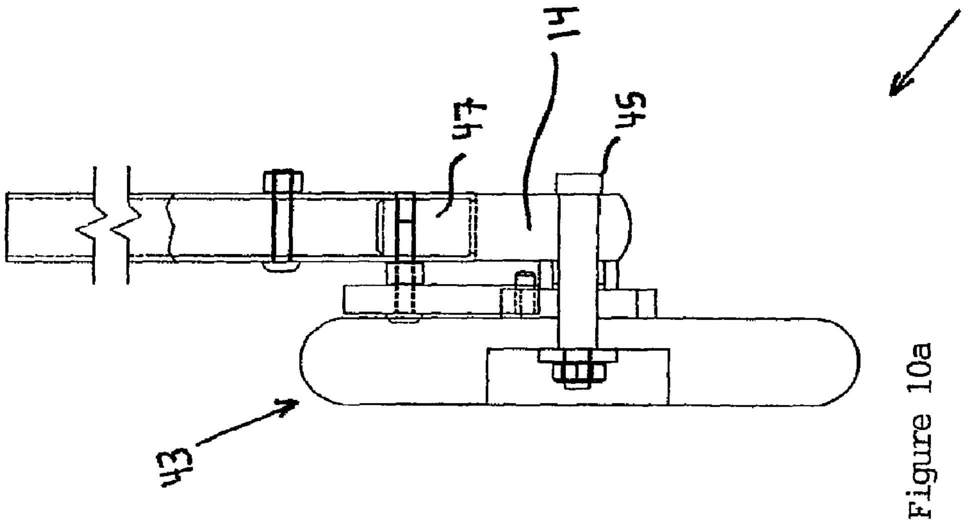

The rear wheel assembly 12 is shown in FIGS. 10*a* and 10*b*. This configuration is for the right hand rear wheel. The left hand version: is the mirror image of this arrangement. The rear wheel 43 is rotationally affixed through a shoulder screw axle 45 to the upright end fitting 47, at the end of the cross support tube assembly 2. It is preferable that the rear wheels of the walker be equipped with, an anti-rollback means, i.e. only forward movement is allowed. For example, an anti-rollback finger 49 can be pivotably connected to the cross support tube assembly 2 and rests freely on the studded hub of the wheel 43. As the wheel 43 rotates rearward (i.e., moves clockwise in the side view), the finger 49 rotates downward (counterclockwise) between two studs. Since the anti-rollback finger 49 reaches its limit of rotation, the wheel 43 locks and cannot continue to move in a clockwise motion. As the walker moves forward, the wheel 43 rotates in a counterclockwise orientation and the finger 49 rotates about the pivot in a clockwise motion. The anti-rollback finger rests on the crest of the studs as ‘the wheel turns, thereby providing unhindered motion the wheel 43.

Figures 11A, 11B:
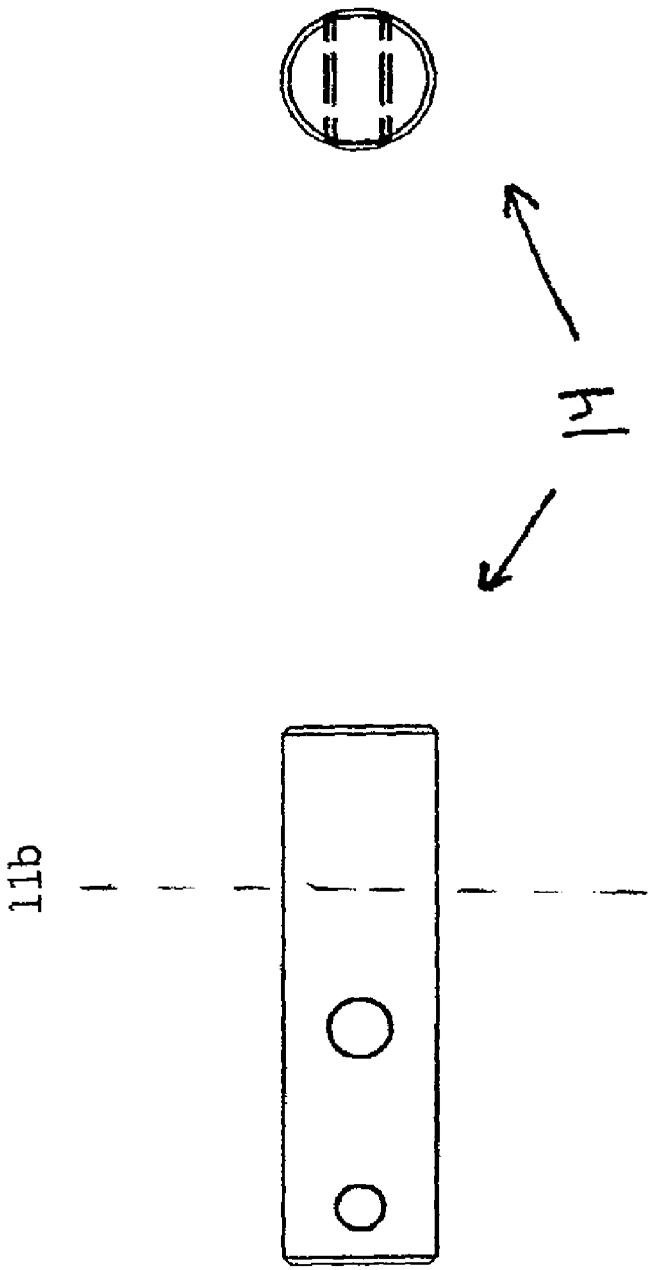
FIG. 11 displays the front and top cross-sectional views respectively of the wheel adapter.

FIGS. 11*a* and 11*b* displays the front and side views of the wheel adapter 14.

Figure 12:
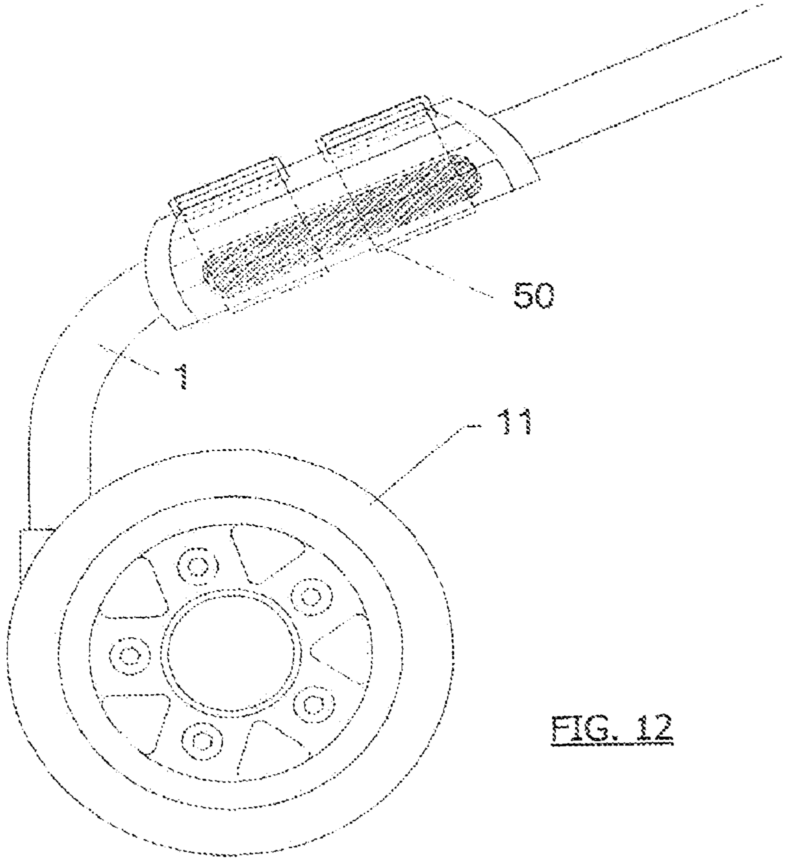
FIG. 12 is a partial side view of stability cuff attached to the front support tube.

FIG. 12 illustrates the stability cuff 50 in its in-use position as secured to the front support tube 1.

Figure 13:
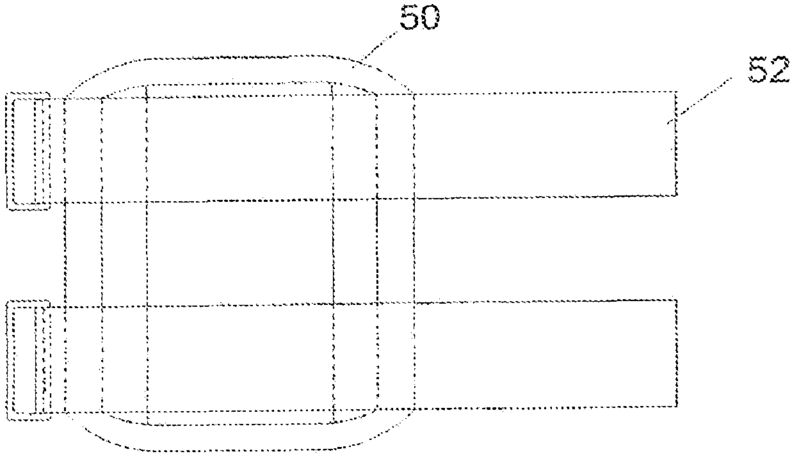
FIG. 13 is the front plan view of the opened stability cuff as removed from the walker.

FIG. 13 shows the open view of the outside surface of the removable, fabric stability cuff. The outer skin is preferably non-expandable to retain the shape of the cuff when wrapped around the end front support tube 1. Two nylon retention straps 52 with hook and loop ends and D-style rings provide a removable, but secure attachment to the front support tube 1.

Figure 14:
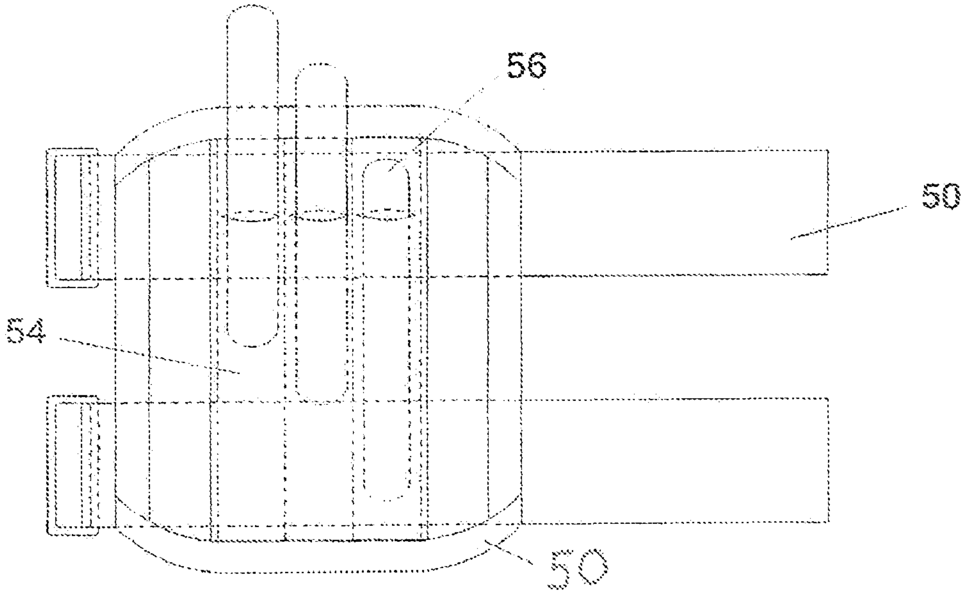
FIG. 14 is a front plan of the inside view of the stability cuff with two of he weights partially inserted in a pocket.

FIG. 14 displays the inner surface of the stability cuff and the pocket 54 that retains the counterweight 5*b*. According to this particular embodiment, three pockets are provided—one for each weight. The pocket envelops and retains the weight within the stretchy inner skin. The pockets each have a slot at one end to allow the weight to be readily inserted into or removed from the stability cuff.

Figure 15:
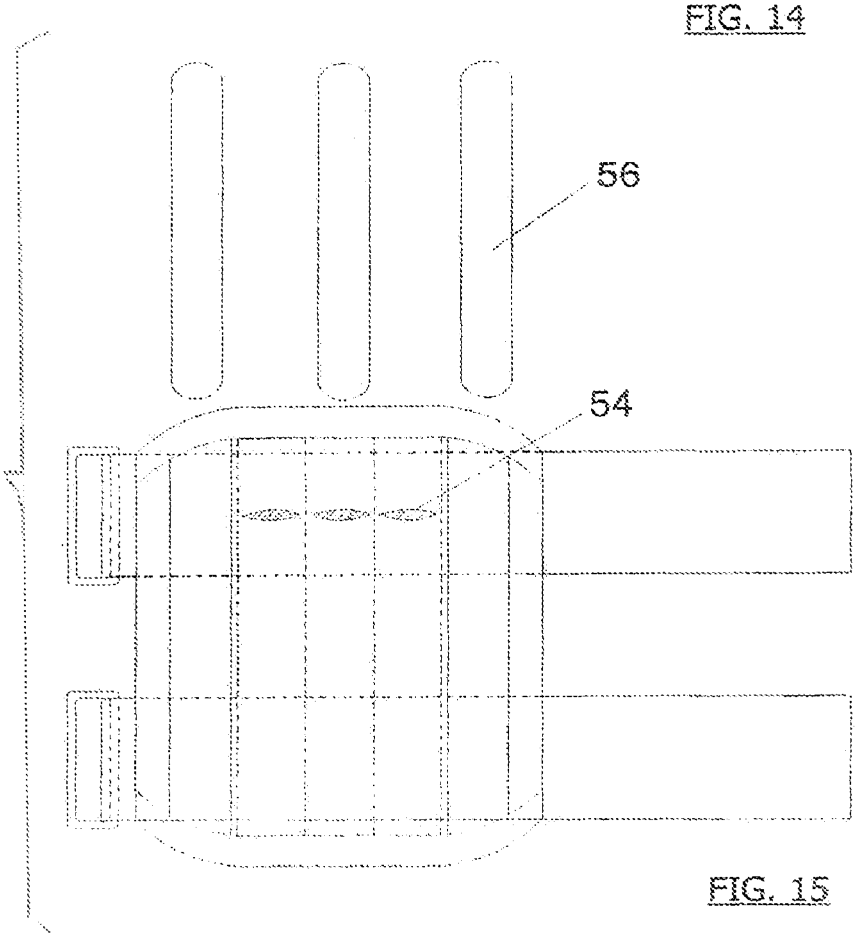
FIG. 15 is a front plan view of the three weights used in the stability cuff.

FIG. 15 shows the three weights that are used within the cuff to provide stability adjustment to the walker. Adding weights to the cuff increases the rearward and lateral stability of the walker. Removing weights from the stability cuff reduces the rearward and lateral stability, and thereby increases the maneuverability of the walker. Preferably, two weighted stability cuffs are located at the terminating ends of the front support tube 1. As an example, each weighted cuff can be 1.5 pounds, providing a total addition of 3 pounds to the front end. If the walker itself is 6.5 pounds, for example, which is achievable if high strength, low weight structural components are implemented as described above, the addition of 3 pounds to the front end would yield a significant difference in the stability of the walker.

Other configurations are possible. For example, one or more stability cuffs could be provided at the terminating ends of the cross support tube assembly 2 to increase the forward stability of the walker, additional pockets could be provided to increase the ballasting of the walker, and the cuff could be slidably attached to the front support tube 1 and moved up the length of the tube to fine tune the stability of the walker. Other locations of the counterweights could be used in alternative embodiments. For example, removable weights could be placed in the backpack to increase the rearward stability of the walker. In sum, the removable weighted stability cuffs enable quick and easy modification of the stability characteristics of the walker.

Figure 16A:
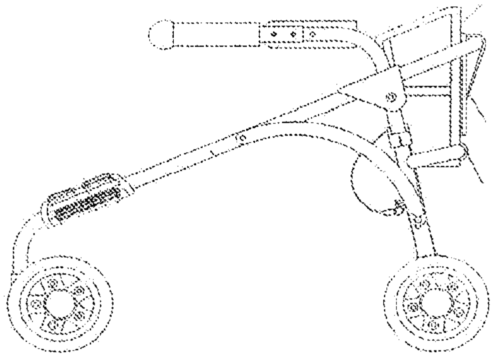
FIGS. 16*a* and 16*b* illustrate the side and rear views backpack as installed on the walker.
Figure 16B:
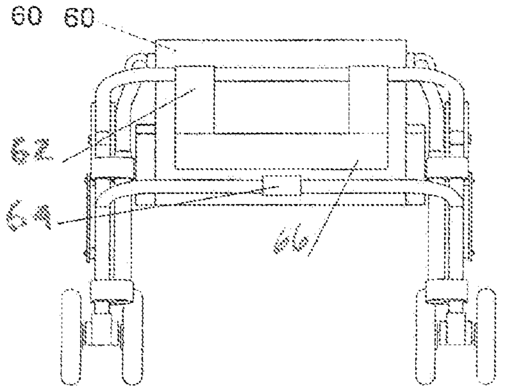

FIGS. 16*a* and 16*b* illustrate the backpack 60 in its in use position on the walker. The backpack 60 can be removably attached between the horizontal member of the front support tube 1 and the cross tube of the cross support tube assembly 2. The upper strap 62 wraps around the upper front support tube and connects to a mating hook and strip fastener strip 66 sewn on the backpack. A lower strap wraps 64, around the rear, support tube to provide lower securement for the bag. According to one configuration, the flap of the backpack faces toward the child user to provide easy access to the internal contents. Compartments within the bag and bilateral mesh drink holders provide storage for school supplies, school notes, toys, snacks, and drinking boxes. The center of mass of the backpack is located inside the axles of the rear wheels, to prevent a loss of rearward stability as the weight of bag contents increases.

Figure 17:
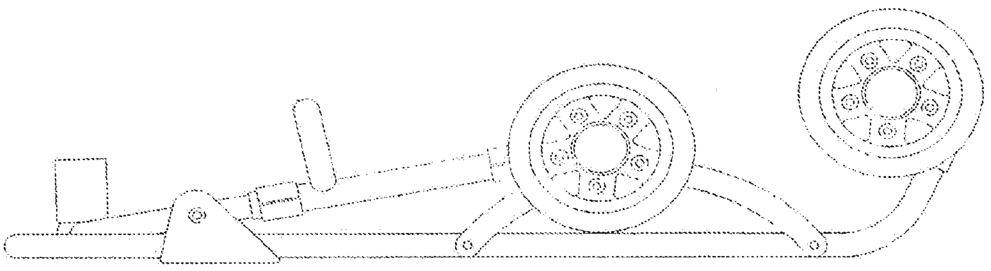
FIG. 17 shows the walker in its folded position.

FIG. 17 shows the walker in its folded position.

The embodiment of the present invention described above addresses many of the shortcomings of existing products. In particular, the walker device of the present invention may comprise one or more of up to seven features typically not found on commercial walkers, including: (a) a light tubular frame configured to ease transfers and improve access to tables in areas frequented by preschoolers and primary school-age children; (b) a handle that is adjustable in height, width and depth to adapt to child sizing, growth, and mobility needs; (c) a flexible back strap that can be adjusted in height and depth to provide circumferential contact of the lower back; (d) one or more weighted stability cuffs removably connected to positions on the walker to adjust the handling and stability of the walker; (e) a tangential brace affixed to strengthen the tubular frame when in use, and pivotable to allow the frame to be folded for storage; (f) two main brackets that interconnect key structural members of the walker; and (g) a compartmentalized, storage backpack to carry children's toys, snacks, and school supplies.

It should be expressly understood that the dimensions and configuration illustrated in the figures are provided, by way of example only and the walker could be easily modified or adjusted by a person skilled in the art, depending on the particular application. It will be appreciated by those skilled in the art that other variations of the one or more embodiments described herein are possible and may be practised without departing from the scope of the present invention.

What is claimed is:

1. A foldable, adjustable wheeled walker comprising:

a. a lightweight tubular frame having
   two rear legs wherein each leg is terminated with single wheels; and
   two front legs wherein each leg is terminated with pivoting dual wheels;

b. two adjustable handle assemblies extending from the rear legs; and c. at least one removable, adjustably weighted stability cuff adapted to engage securely and circumferentially to the light weight tubular frame and consists of, elasticized, closable pockets, each pocket consisting of a slot at one end to allow a weight to be foldable, adjustable or removed.

2. A foldable, adjustable wheeled walker as described in claim 1, wherein the single wheels attached to the rear legs are equipped with an anti-rollback means.

3. A foldable, adjustable wheeled walker as described in claim 2 wherein a cross-brace on each side of the walker provides a structural link between the two rear legs and the two front legs through a pivot means and one end of each cross-brace is disconnectable allowing for the rear legs and the front legs to fold towards the lightweight tubular frame.

4. A foldable, adjustable wheeled walker as described in claim 1, wherein each handle assembly comprises a width, vertical and depth adjustment means.

5. A foldable, adjustable wheeled walker as described in claim 4, wherein the width adjustment means includes a hand grip adapted to engage a handle extension member, and the handle extension member connects to a handle extension receiver wherein each handle extension member is bent in two planes, one bend to position the handle extension member inwardly to position the hand grip in close proximity of the user and another bend to position the handle extension member in an orientation parallel to the ground.

6. A foldable, adjustable wheeled walker as described in claim 4, wherein the depth adjustment means includes a hand grip telescopically and removably connected to a horizontal end of a handle extension member.

7. A foldable, adjustable wheeled walker as described in claim 6 wherein the hand grip is connected to the handle extension member by a pair of fasteners and threaded back strap retainers.

8. A foldable, adjustable wheeled walker as described in claim 4, wherein the vertical adjustment means includes a terminal end of each handle assembly located slidably within a handle extension receiver wherein the handle extension receiver is connected to the light weight tubular frame by at least one dual tube split clamps and the height of each handle assembly is adjustable via a removable double ball lock pin.

9. A foldable, adjustable wheeled walker as described in claim 1, wherein the foldable, adjustable wheeled walker further comprises an adjustable rear support connects from one handle assembly to the other and contains a contact surface at or above the hips of a user of the walker.

10. A foldable, adjustable wheeled walker as described in claim 3, wherein a backpack can be removably attached to the frame between the two cross-braces.

* * * * *